May 12, 1970 — R. F. O'BRIEN — 3,511,555

PORTABLE PROJECTION SCREEN

Filed July 13, 1967 — 2 Sheets-Sheet 1

ROBERT F. O'BRIEN
INVENTOR.

BY William F. Delaney, Jr.
Robert W. Hampton
ATTORNEYS

May 12, 1970  R. F. O'BRIEN  3,511,555
PORTABLE PROJECTION SCREEN

Filed July 13, 1967  2 Sheets-Sheet 2

ROBERT F. O'BRIEN
INVENTOR.

BY William F. Delaney Jr.
Robert W Hampton
ATTORNEYS

3,511,555
PORTABLE PROJECTION SCREEN
Robert F. O'Brien, Rochester, N.Y., assignor to Eastman Kodak Company, Rochester, N.Y., a corporation of New Jersey
Filed July 13, 1967, Ser. No. 653,051
Int. Cl. G03b 21/56
U.S. Cl. 350—117                  3 Claims

ABSTRACT OF THE DISCLOSURE

A lightweight portable projection screen has a substantially rigid frame which is made of a moldable cellular polymer. A sheet of reflective screen material is mounted on the frame. An adjustable support member is pivotally attached to the frame member by a hinge, part of which is molded integrally in the frame.

---

This invention relates to portable projection screens, and more particularly to lightweight rigid frames for mounting and carrying projection screens.

Portable projections screens adapted for such uses as home and schoolroom projection are commonly flexible and adapted to roll up into a carrying case which is generally cumbersome and heavy. Due to the flexibility of such screens, they cannot retain a permanent curvature and are generally stretched to a flat configuration during projection use.

A large part of the light received by a flat screen from a projection source is usually wasted in undesirable reflection, for example, vertically above and below audiences distributed in a horizontal plane relative to the screen. To provide a more efficient use of the projected image light, the projection screen may be curved to control the direction of image reflection.

The inability of most projection screen material to retain a curved shape usually requires that the reflective screen material be mounted on a rigid support structure. This rigidity is necessary to insure that the curvature in the screen is retained throughout the useful life of the screen. However, such a rigid structure generally adds to the size, weight, and cost of the screen. Heretofore, these factors have limited the use of curved screens to theatre and other commercial applications, and screens for use in the home or schoolroom have been typically the flat type described above.

It is an object of this invention to provide an improved inexpensive lightweight portable projection screen.

It is another object of this invention to provide a lightweight, rigid projection screen, which may have any desirable curvature.

It is another object of this invention to provide an improved projection screen mounted in a rigid lightweight, inexpensive, molded frame adapted to be carried and mounted on a surface or hung from a wall.

In the disclosed embodiments of the present invention, a reflective screen material is mounted in a molded rigid frame formed of a cellular polymer. The frame is provided with a supporting means adapted to support the screen on a horizontal surface or to hang the screen from a vertical surface. The supporting means may be attached to the frame by friction hinges which comprise in one disclosed embodiment of the invention, a boss intricately molded on the frame, and a cup-shaped member fixed to the supporting means arranged to frictionally engage the boss, whereby the friction resists rotation of the cup on the boss.

The invention will be more readily understood by reference to the drawing in which.

Figure 1:
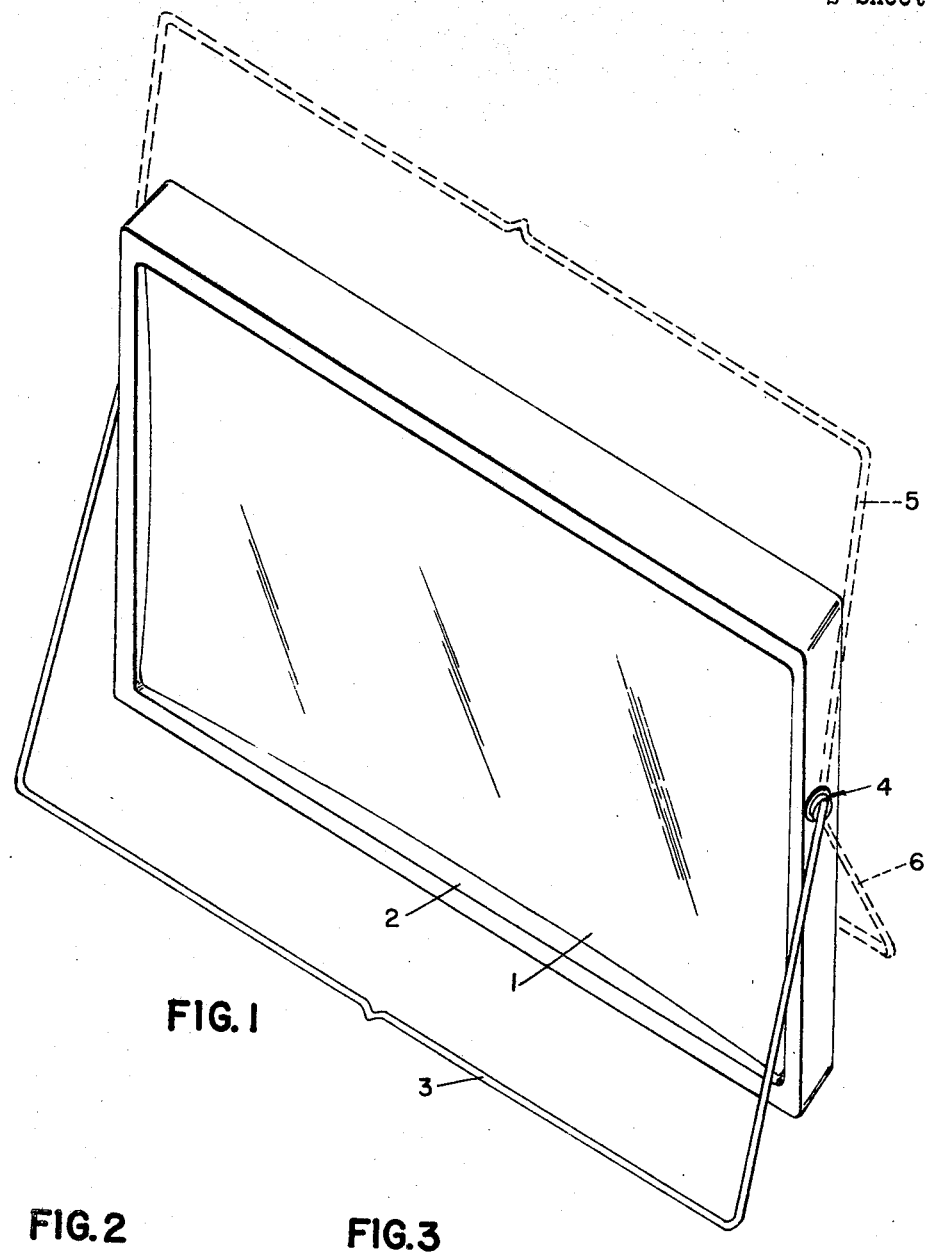
FIG. 1 is a perspective view of a projection screen according to the invention.

Referring to FIG. 1, a portable projection screen according to one embodiment of the invention comprises a reflective screen material 1 mounted in a rigid frame structure 2 formed of a cellular polymer, such as, for example foamed polystyrene, polyurethane or polyvinylchloride. Such rigid foamed materials provide inexpensive and lightweight frame structures which can be molded in one piece. The frame 2, as shown in FIG. 1, may be provided with a flange around the periphery of the reflective screen material for the protection of the screen material. If the screen material is semirigid, it may be adapted to be retained in its mounted position by an interference fit with the flange. Other means may also be employed to mount the screen material in the frame, such as by an adhesive for example. A preferred embodiment in accordance with this approach is an integral frame having aluminum foil material connected to the supporting surface. If the screen 1 is to be curved, the frame 2 may be molded with a screen supporting surface having the desired curved configuration.

The frame 2 may be provided with support means, which in the FIG. 1 embodiment comprises a wire bracket 3 attached by means of hinges 4 adapted to permit the wire bracket to rotate completely around the screen to any desired position. Several of the many possible positions are indicated by dashed lines 5 and 6. The hinges 4 are adapted to frictionally hold the support member in any selected position, so that the screen may be supported on a horizontal surface or hung from a vertical surface.

Figure 2:
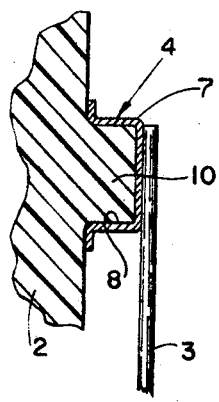
FIG. 2 is a sectional view of a hinge assembly for attaching the supporting means to the frame.
Figure 3:
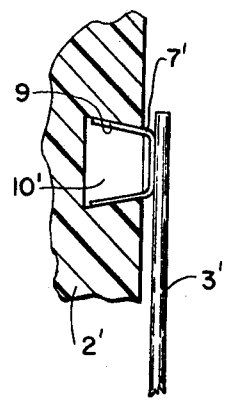
FIG. 3 is a view similar to FIG. 2 of an alternative embodiment of the hinge assembly with elements corresponding to similar elements in FIG. 2 identified with primed numbers.

FIGS. 2 and 3 show alternative embodiments of the hinges 4, each of which comprises a cup shaped member 7 or a U-shaped member 7' frictionally engaging a surface of the frame 2 provided for that purpose. In the FIG. 2 embodiment, the member 7 is retained in frictional engagement by an interference fit against the external surface 8 of a boss member 10 which may be molded integrally with frame 2. In the FIG. 3 embodiment of the invention, U-shaped member 7' is retained in frictional engagement against the internal surface 9 of a recess which may be provided in the molding of the frame 2'. To guarantee a secure interference fit, the bosses of recesses may be made slightly noncylindrical, although the interference fit may be provided solely by a slight compression of the frame material by spring tension provided by the U-shaped member 7' or cup-shaped member 7. Either of these hinge arrangements permit the wire bracket 3 attached to the cup shaped member 7, or bracket 3' attached to the U-shaped member 7', to rotate to the different positions indicated in FIG. 1.

Figure 4:
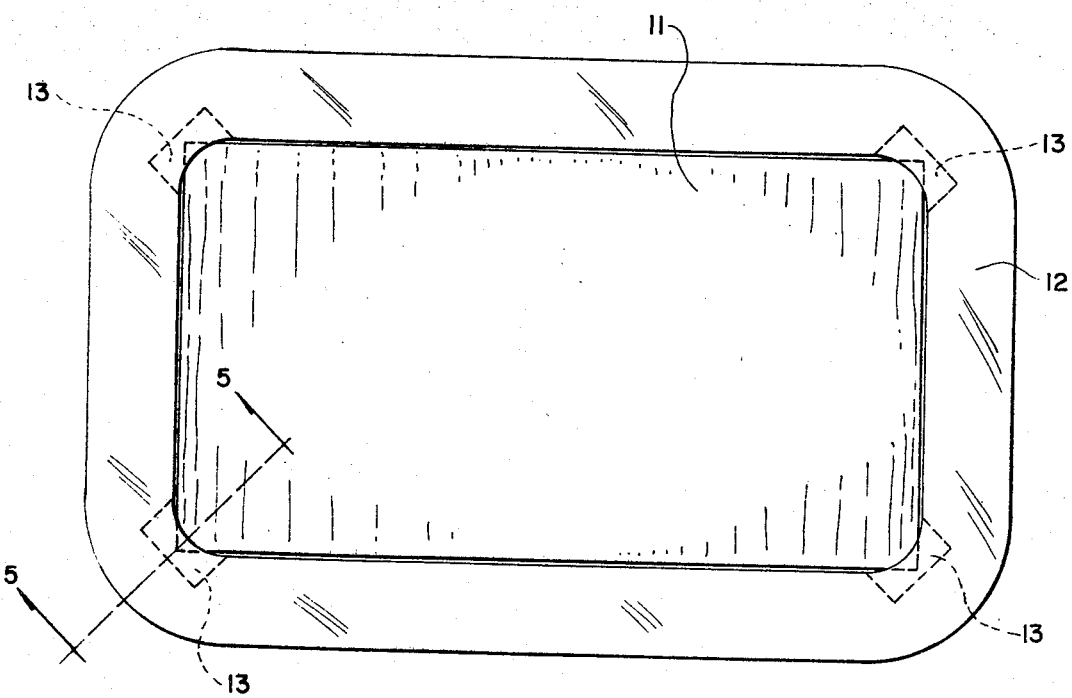
FIG. 4 is an elevation front view of a projection screen according to an alternative embodiment of the invention.
Figure 5:
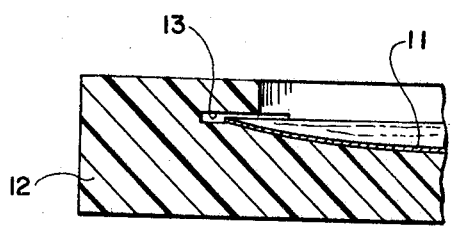
FIG. 5 is a sectional view of a portion of FIG. 4 taken along the lines 5—5.

FIGS. 4 and 5 show another method for mounting a semirigid screen material in a frame, according to an alternative embodiment of the invention. The frame 12 is provided with slots 13 at the four corners of a recess in the frame defined by an integrally molded flange. The screen material 11 is adapted to be positioned in the frame recess with the corners of the screen material inserted in the slots 13, which retain the screen in its mounted position. This embodiment avoids any tendency of the screen material to buckle or warp, as may result from methods of mounting.

Although the invention has been described in considerable detail with reference to certain preferred embodiments thereof, it will be understood that variations and modifications can be effected without departing from the spirit and scope of the invention as described hereinabove and as defined in the appended claims.

I claim:
1. A projection screen comprising a substantially rigid frame formed from a moldable cellular polymeric material, a reflective screen material mounted on said frame, an adjustable support member, and a hinge assembly pivotally connecting the support member to the frame, said hinge assembly including a first member integrally molded on said frame and a second member attached to said support member, said hinge members being retained in pivotal engagement with each other through frictional interference.

2. A portable projection screen as claimed in claim 1 wherein said first hinge member comprises a cylindrical detent molded onto said frame, and said second member comprises a cup frictionally engaging the detent in an interference fit.

3. A projection screen comprising:
a substantially rigid frame formed from a moldable cellular polymeric material, said frame being molded to define a generally rectangular recess and slots in the portions of the frame defining the corners of said recess;
a semirigid, generally rectangular sheet mounted in the generally rectangular recess with each corner of the sheet being inserted in the slot of the corresponding corner of the recess for retaining the sheet within the recess.

References Cited
UNITED STATES PATENTS

| | | | |
|---|---|---|---|
| 651,129 | 6/1900 | Becker | 248—470 |
| 992,857 | 5/1911 | Cooke et al. | 350—117 |
| 1,092,965 | 4/1914 | Wiegand | 248—470 |
| 2,684,341 | 7/1954 | Anspon | 350—117 X |
| 3,222,437 | 12/1965 | Schilling | 260—2.5 X |
| 3,243,388 | 3/1966 | Ulfstedt | 260—2.5 |
| 3,243,485 | 3/1966 | Griffin | 260—2.5 X |
| 3,255,988 | 6/1966 | Albee | 350—117 X |
| Re. 24,514 | 8/1958 | Hoppe | 260—2.5 |

FOREIGN PATENTS

| | | |
|---|---|---|
| 21,269 | 1896 | Great Britain. |
| 805,216 | 12/1958 | Great Britain. |
| 75,718 | 9/1917 | Switzerland. |

NORTON ANSHER, Primary Examiner

M. H. HAYES, Assistant Examiner